(12) United States Patent
Schooley et al.

(10) Patent No.: US 9,938,813 B2
(45) Date of Patent: Apr. 10, 2018

(54) OIL RECOVERY PROCESS INCLUDING ENHANCED SOFTENING OF PRODUCED WATER

(71) Applicant: Veolia Water Technologies, Inc., Moon Township, PA (US)

(72) Inventors: Karen Schooley, Seattle, WA (US); David E. Gamache, Oswego, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 484 days.

(21) Appl. No.: 14/724,000

(22) Filed: May 28, 2015

(65) Prior Publication Data

US 2015/0345277 A1    Dec. 3, 2015

Related U.S. Application Data

(60) Provisional application No. 62/006,620, filed on Jun. 2, 2014.

(51) Int. Cl.

| | |
|---|---|
| *E21B 43/24* | (2006.01) |
| *E21B 43/40* | (2006.01) |
| *C09K 8/592* | (2006.01) |
| *C02F 1/04* | (2006.01) |
| *C02F 1/52* | (2006.01) |
| *C02F 1/66* | (2006.01) |
| *C02F 103/36* | (2006.01) |
| *C09K 8/528* | (2006.01) |

(52) U.S. Cl.
CPC .............. *E21B 43/40* (2013.01); *C02F 1/041* (2013.01); *C09K 8/592* (2013.01); *E21B 43/24* (2013.01); *E21B 43/2406* (2013.01); *C02F 1/5236* (2013.01); *C02F 1/66* (2013.01); *C02F 2103/365* (2013.01); *C09K 8/528* (2013.01)

(58) Field of Classification Search
CPC ...... E21B 43/24; E21B 43/2406; E21B 43/40; C02F 1/041; C09K 8/592

See application file for complete search history.

(56) References Cited

U.S. PATENT DOCUMENTS

| 5,496,448 A | 3/1996 | Vuong | |
|---|---|---|---|
| 6,733,636 B1 * | 5/2004 | Heins | ........................ C02F 1/04 159/24.1 |
| 8,469,091 B2 * | 6/2013 | Bjorklund | ........... E21B 41/0057 166/266 |

(Continued)

FOREIGN PATENT DOCUMENTS

| CA | 2863015 A1 | 11/2013 |
|---|---|---|
| CL | 201502101 A | 6/2016 |

(Continued)

*Primary Examiner* — Matthew R Buck
(74) *Attorney, Agent, or Firm* — Coats & Bennett PLLC

(57) ABSTRACT

A process is provided for treating produced water resulting from an oil recovery operation. Produced water is subjected to a softening process wherein a caustic or other softening reagent is added to the produced water to increase the pH of the produced water. Downstream of softening, there is provided an evaporator for evaporating at least a portion of the produced water and producing steam and a concentrated brine. At least a portion of the concentrated brine is recycled upstream of the evaporator and mixed with the produced water and the softening reagent to enhance the softening process.

11 Claims, 1 Drawing Sheet

(56) References Cited

U.S. PATENT DOCUMENTS

| | | | |
|---|---|---|---|
| 8,899,326 B2* | 12/2014 | Vasudevan | C02F 9/00 |
| | | | 122/6 R |
| 8,951,392 B2 | 2/2015 | James | |
| 9,221,701 B2* | 12/2015 | Richardson | B01D 1/16 |
| 9,328,601 B2* | 5/2016 | Chen | E21B 43/40 |
| 9,738,553 B2* | 8/2017 | Chidambaran | C02F 9/00 |
| 2003/0127226 A1* | 7/2003 | Heins | C02F 1/04 |
| | | | 166/303 |
| 2012/0145386 A1* | 6/2012 | Bjorklund | B01D 1/065 |
| | | | 166/266 |
| 2015/0292314 A1* | 10/2015 | Xia | C02F 9/00 |
| | | | 166/266 |
| 2015/0360972 A1 | 12/2015 | Reuveni et al. | |
| 2016/0214878 A1* | 7/2016 | Weimer | C02F 1/42 |

FOREIGN PATENT DOCUMENTS

| | | |
|---|---|---|
| PL | 314593 A1 | 9/1996 |
| PL | 406241 A1 | 5/2014 |
| WO | 2008073963 A1 | 6/2008 |
| WO | 2010091357 A1 | 8/2010 |
| WO | 2012068590 A1 | 5/2012 |
| WO | 2012100319 A1 | 8/2012 |
| WO | 2013049378 A2 | 4/2013 |

* cited by examiner

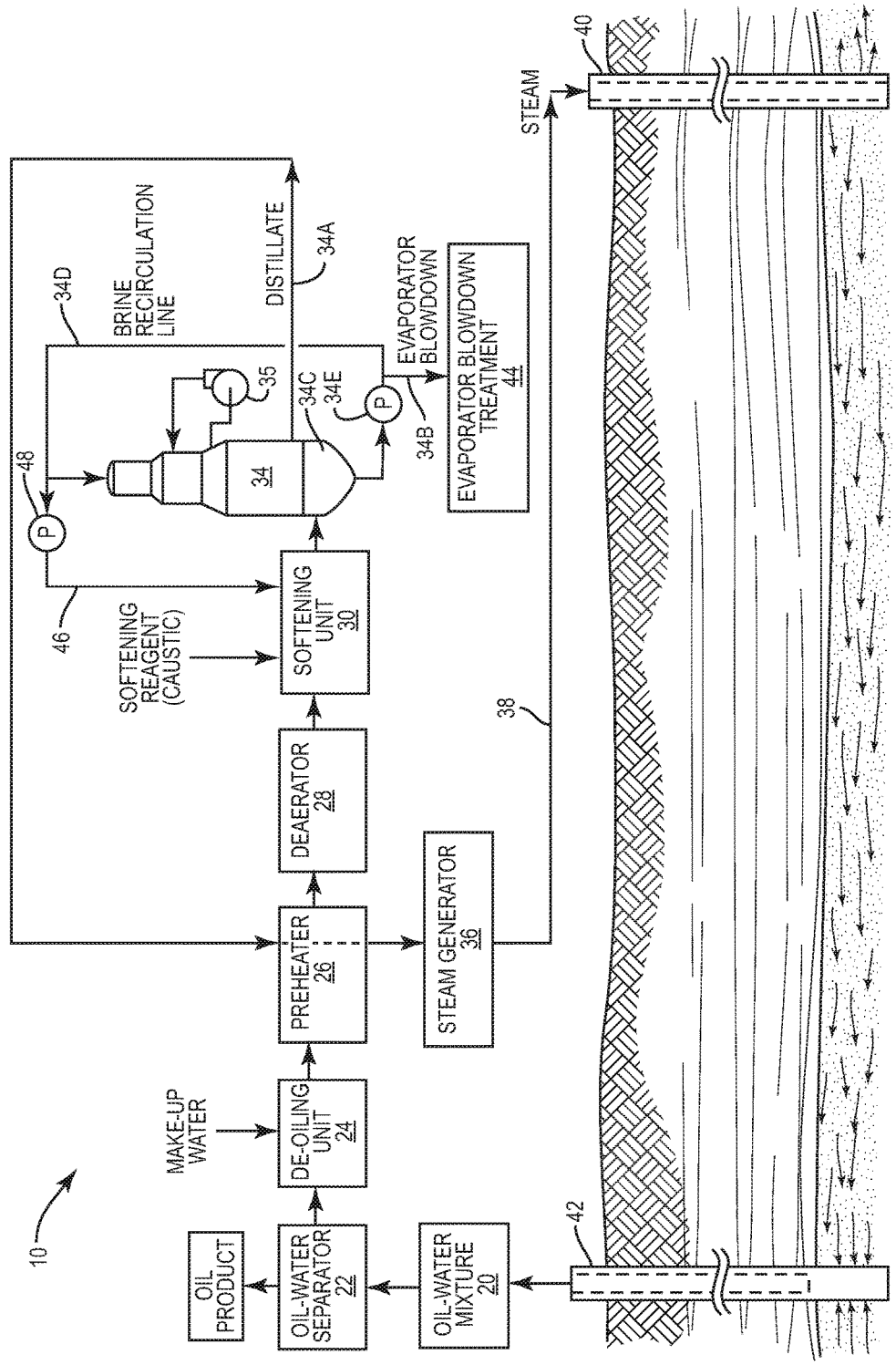

OIL RECOVERY PROCESS INCLUDING ENHANCED SOFTENING OF PRODUCED WATER

FIELD OF THE INVENTION

The present invention relates to systems and processes for recovering oil from oil-bearing formations and more particularly to an improved softening process for removing hardness from produced water.

BACKGROUND OF THE INVENTION

Enhanced oil recovery (EOR) processes employ thermal energy to facilitate the recovery of oil, particularly heavy oil, from oil-bearing formations. One particular process widely used in Canada for recovering heavy oil is referred to as steam assisted gravity drainage (SAGD). In a SAGD process, steam is injected into the oil-bearing formation. Generally, several tons of steam is required for each ton of oil recovered. In this process, steam heats the oil in the oil-bearing formation and this reduces the viscosity of the oil and facilitates the flow of oil to a collection area. In this process, however, steam condenses and mixes with the oil to form an oil-water mixture. The mixture of oil and water is pumped to the surface and oil is separated from the water by conventional processes that form what is referred to as produced water.

It is important to treat produced water so that it can be reused. In a SAGD application, the produced water is treated or purified and is directed to a steam generator or boiler that produces steam. In a SAGD application, for example, the complete water cycle includes: (1) injecting the steam into an oil-bearing formation; (2) condensing the steam to heat the oil which results in the condensed steam mixing with the oil to form an oil-water mixture; (3) collecting the oil-water mixture; (4) pumping the oil-water mixture to the surface; (5) separating oil from the oil-water mixture to form the produced water; (6) treating the produced water by removing suspended and dissolved solids to form a feedwater stream for the steam generator or boiler and (7) converting the feedwater into steam that is injected into the oil-bearing formation.

Produced water typically includes significant concentrations of calcium hardness as well as alkalinity, especially when the produced water is mixed with make-up saline water which contains a lot of hardness. The presence of calcium and alkalinity in the produced water often leads to the precipitation of calcium carbonate scaling compounds. In processes that employ evaporators, for example, calcium carbonate scaling can be a serious problem. This causes the calcium carbonate precipitates to scale heat transfer tubes and preheater heating surfaces substantially decreasing the efficiency, and resulting in expensive and time-consuming maintenance.

In the past, calcium carbonate scaling of evaporators and process equipment has been dealt with upstream of the evaporator or process equipment by acidification and degasification. This process reduces the alkalinity concentration in the wastewater stream. However, acidification and degasification have drawbacks. The acid cost can be prohibitive if the wastewater has a high alkalinity concentration. In addition, in some applications where organics are present in the wastewater, the organics precipitate in response to acidification. In other cases, an ion exchange softening unit only is employed to remove hardness. This process typically reduces the concentration of calcium and magnesium in the produced water. When used as the sole means of reducing hardness, ion exchange units also have drawbacks. The use of ion exchange softening adds extra cost and generates a liquid waste stream which often requires treatment. Also, as a practical matter, there is a limitation on the calcium concentration to be treated by ion exchange resin. Another option for dealing with produced water streams having hardness is employing a chelant or chelant agent inside the evaporator or other process equipment. This chelant agent maintains calcium in a soluble form and hence prevents precipitation. The drawback here is that efficiency is limited and chelant agents are expensive.

SUMMARY OF THE INVENTION

The present invention relates to a process for recovering oil and treating resulting produced water having hardness. The produced water is softened by mixing one or more softening reagents with the produced water to raise the pH of the produced water. This results in hardness compounds being precipitated from the produced water. The softened produced water is directed to an evaporator which evaporates at least a portion of the produced water and produces steam and a concentrated brine. At least a portion of the concentrated brine is used to soften the produced water upstream of the evaporator. That is, at least a portion of the concentrated brine is directed to a point upstream of the evaporator and mixed with the produced water. Thus, the softening reagent or reagents and the concentrated brine combine to raise the pH of the produced water and cause hardness compounds to precipitate therefrom.

In one embodiment, the softening reagent is a caustic. Caustic is mixed with the produced water upstream of the evaporator. Concentrated brine from the evaporator is recycled to a point upstream of the evaporator and mixed with the produced water. In one example, the caustic is added to the produced water in a softening tank. The concentrated brine is recycled back to the softening tank where the concentrated brine mixes with the produced water and the caustic.

In another embodiment, there may be no need for a softening reagent or reagents. The concentrated brine recycled to a point upstream of the evaporator may be sufficient to raise the pH of the produced water.

Other objects and advantages of the present invention will become apparent and obvious from a study of the following description and the accompanying drawings which are merely illustrative of such invention.

BRIEF DESCRIPTION OF THE DRAWINGS

FIG. 1 is a schematic illustration of the present invention showing an oil recovery process that results in the production of produced water and the treatment thereof.

DESCRIPTION OF EXEMPLARY SYSTEM AND PROCESS

The process disclosed herein is a process for recovering oil, particularly heavy oil such as recovered by SAGD processes, from oil wells and oil-bearing formations. Heavy oil is typically removed by injecting steam into oil-bearing underground formations. Steam heats the oil in the oil-bearing formation and in the process the steam condenses. This produces an oil-water mixture. The oil-water mixture is pumped to the surface. An oil-water separation process follows where oil is separated from the mixture. This leaves what is referred to as produced water. The produced water is reused to generate steam that is directed back into the oil-bearing formation.

Before the produced water can be reused to generate steam, it is treated. This is because produced water often includes suspended solids, dissolved solids and dissolved gases. Most produced water includes hardness. The primary cause of hardness is the presence of multivalent ions, such as calcium ($Ca^{2+}$) and magnesium ($Mg^{2+}$). Concentrations of hardness in produced water can vary. At relatively high concentrations, hardness poses serious problems because it scales process equipment, such as heat transfer surfaces in evaporators and their related preheaters. As discussed herein, the system and process for treating produced water entails the use of steam generators, evaporators, as well as other process equipment. The process described herein aims to avoid significant hardness scaling of process equipment, particularly the surfaces of heat transfer tubes of evaporators and preheaters. As further discussed below, when hardness in the produced water is a concern, the pH of the produced water is raised upstream of the evaporator. This causes hardness compounds such as calcium carbonate and magnesium hydroxide to precipitate from the produced water.

With reference to FIG. 1, there is shown therein an oil recovery system and process that is indicated generally by the numeral 10. An oil-water mixture 20 is collected from the oil well 42 and pumped to the surface. The oil-water mixture is directed to an oil-water separator 22. This is generally referred to as a primary oil-water separation process. Various conventional oil-water separation systems can be employed. For example, gravity or centrifugal separators can be used to separate the oil-water mixture to yield an oil product and separated water. The oil product can be further treated and sold. Separated water is directed to a de-oiling unit 24 where additional oil is removed. Various de-oiling devices, such as a dissolved air flotation system, can be used. In some instances, a de-oiling polymer is added to the water separated by the oil-water separator 22. The output or effluent from the de-oiling unit 24 is referred to as produced water. It is this produced water that is treated and conditioned before being reused to generate steam.

Produced water from the de-oiling unit 24 is directed to and through a preheater 26 where the produced water is heated. Various types of preheaters can be utilized. In one embodiment, the preheater 26 includes a heat exchanger through which the produced water passes. Various heat sources can be utilized to supply heat to the preheater 26. In one embodiment, a distillate stream produced by a downstream evaporator is directed through the preheater 12 for heating the produced water passing therethrough.

From the preheater 26, the produced water is directed to a deaerator 28 that removes oxygen, carbon dioxide and other non-condensable gases from the produced water passing through the deaerator. It should be noted that preheating and deaerating the produced water is optional.

Downstream of the deaerator 28 is a softening unit 30. Produced water from the deaerator 28 is directed into a softening unit which typically includes one or more tanks having mixers for mixing one or more softening reagents with the produced water to soften the produced water. In one embodiment, the softening reagent is a caustic which is typically sodium hydroxide. In this embodiment, the pH of the produced water is raised to approximately 10 to approximately 11. In other embodiments, other softening reagents can be used. For example, the softening unit 30 may employ lime or soda ash softening. As will be discussed in further detail below, the softening process carried out by the softening unit 30 is enhanced by recycling a portion of concentrated brine produced by a downstream evaporator 34 to the softening unit 30. The concentrated brine has a relatively high pH and is mixed with the produced water and the softening reagent in the softening unit 30 to increase the pH of the produced water. Therefore, it is appreciated that, in one embodiment, raising the pH of the produced water in the softening unit 30 is accomplished by mixing both the softening reagent and a portion of the concentrated brine with the produced water. It should be appreciated that when a softening reagent or reagents are used, the softening reagent or reagents can be injected at various points upstream of the evaporator. In a preferred embodiment, however, it is desirable to mix or add the softening reagent or reagents with the produced water downstream of the deaerator 28.

Generally, raising the pH of the produced water to a pH range of approximately 10 to approximately 11 has the effect of lowering the solubility limits of hardness compounds such as calcium carbonate and magnesium hydroxide. This results in these hardness compounds precipitating from the produced water. By precipitating hardness from the produced water, scaling due to hardness in downstream equipment is avoided or significantly reduced. In particular, it is hypothesized that by precipitating hardness compounds upstream of process equipment that the precipitated hardness compounds will tend to flow through the process equipment, such as the heat transfer tubes of the evaporator 34, without significantly scaling the surfaces thereof.

Substantially raising the pH of the produced water upstream of the evaporator has other advantages. Produced water typically has a significant concentration of silica or silica-based compounds. It is not uncommon to find silica present in produced water at about 200 mg/L (as $SiO_2$). By raising the pH of the produced water to a range of 10-11 addresses silica scaling in addition to hardness scaling. By adding a softening reagent such as caustic to the produced water and raising the pH of the produced water, this results in increasing the solubility of silica. That is, silica solubility increases substantially with an increase in pH. In the process of FIG. 1, the pH of the produced water is sufficiently raised such that silica or silica-based compounds in the produced water remain in solution as the produced water passes through the evaporator 34. It is appreciated that in practice there may be some suspended silica in the concentrated brine produced by the evaporator 34. However, according to the process contemplated herein, this would be minimal as a majority, or in some cases substantially all, of the silica should remain in solution and eventually pass with the evaporator blowdown.

As an option, the treatment system 10, shown in FIG. 1, may include an ion exchange unit downstream of the softening unit 30. When employed, the produced water from the softening unit 30 is directed into the ion exchange, such as a weak acid cation exchange, that may be operated in a number of modes. For example, when operated in a sodium mode, the ion exchange unit is operative to remove hardness. When the ion exchange unit is operated in a hydrogen mode, it is operative to simultaneously remove both hardness and alkalinity. In any event, in the process described in FIG. 1, if there is a need to employ an ion exchange unit downstream of a softening unit 30, it would serve a polishing function in that it would be designed to remove at least a portion of the residual hardness existing after the produced water has been subjected to softening in the softening unit 30.

Downstream of the softening unit 30 or downstream of an ion exchange unit, if employed, is an evaporator 34. In order to address capacity, there may be provided a series of evaporators. In any event, the evaporator 34 produces steam and a concentrated brine. The steam condenses to form a distillate 34A. Concentrated brine is collected in the sump 34C and recirculated through the evaporator 34 by a pump 34E that pumps the concentrated brine through brine recirculation line 34D. A portion of the concentrated brine is directed as evaporator blowdown through line 34B to an evaporator blowdown treatment unit 44.

Evaporator distillate 34A is substantially pure. There may be a small amount of dissolved solids, on the order of 10 mg/L or less, in the distillate 34A. In any event, distillate 34A is routed through the preheater 26 and directed to a steam generator 36 where the distillate is converted to steam. Various types of steam generators can be employed. For example, the steam generator 36 may include a conventional boiler or packaged boiler. Moreover, the steam generator 36 may be a once through steam generator (OTSG) that is employed with a steam-water separator for separating steam from a steam-water mixture produced by the OTSG. Steam generator 36 produces a steam stream 38 that is directed from the steam generator to an injection well 40. In the embodiment illustrated, the injection well 40 is spaced from the oil well 42 that actually produces the oil-water mixture 20. In conventional fashion, steam injected into the injection well 40 migrates horizontally to an area around an oil well 42 when the steam engages the oil in the oil well or oil-bearing formation and condenses to reduce the viscosity of the oil and generally mobilize the oil to produce the oil-water mixture 20 referred to above.

Evaporator 34, shown in FIG. 1, may be of various types. For example, the evaporator 34 may be a vertical falling film evaporator, a forced circulation evaporator, a horizontal evaporator or a rising film evaporator. In the case of a vertical falling film evaporator, the same includes an array of vertical tubes, the sump 34C for collecting and holding concentrated brine, a recirculating line 34D leading from the sump to an upper portion of the evaporator for discharging brine into the upper ends of the vertical tubes and a pump 34E disposed in the recirculating brine line for pumping brine from the sump to the upper portion of the evaporator where the brine is discharged into the tubes. When the brine is discharged into the upper ends of the tubes, the brine forms a thin brine film that falls down along the inside surfaces of the tubes. The tubes are heated, resulting in a portion of the brine vaporizing and forming a vapor, and in the process the brine is concentrated and falls into the sump 34C. Evaporator 34, in this example, is a mechanical vapor recompression (MVR) evaporator. The produced vapor is received by a compressor 35 and compressed, producing steam which is directed against the outside of the tubes, again heating the thin film of brine falling downwardly along the inside surfaces of the tubes. The steam condenses and produces the distillate 34A that is directed to the steam generator 36. A small portion of the concentrated brine is wasted as evaporator blowdown 34B.

In some cases, the evaporator blowdown stream 34B is suitable for disposable by deep well injection. In other cases, as noted above, the evaporator blowdown 34B is directed to the evaporator blowdown treatment unit 44. Here the evaporator blowdown can be further concentrated or subjected to a crystallizing process in a crystallizer which can produce a Reduced Liquid Discharge option, or even a zero liquid discharge when a dryer (such as a double drum dryer for example) is used after the crystallizer. In other cases, the evaporator blowdown can be subjected to a silica precipitation process followed by a suspended solids removal process that removes suspended solids therefrom. Thereafter, the treated evaporator blowdown stream can be disposed of through deep well injection.

As briefly discussed above, the present invention includes a softening enhancement. The enhancement includes directing at least a portion of the concentrated brine from the evaporator 34 to the softening unit 30. As shown in FIG. 1, in one embodiment, a pump 48 is employed to direct a portion of the concentrated brine through line 46 into the softening unit 30. Here the brine from the evaporator 34 is mixed with the produced water and the softening reagent or reagents to raise the pH of the produced water and cause hardness compounds to precipitate from the produced water. The concentrated brine produced by the evaporator 34 has a relatively high pH due to the pretreating (caustic addition, for example) of the produced water that takes place upstream of the evaporator 34. Thus, the softening reagent or reagents and the concentrated brine combine to raise the pH of the produced water which, in one embodiment, is raised to approximately 10 to approximately 11. The use of at least a portion of the concentrated brine in the softening unit 30 enhances the overall softening process. In addition, the mixing of the concentrated brine with the produced water in the softening unit 30 reduces the amount of softening reagents required to raise the pH to the desired level. This is particularly beneficial when the softening reagent is a caustic because caustic softening is usually more costly than some other softening processes, such as softening by lime and soda ash.

The amount of concentrated brine recycled will vary depending on the flow of produced water into the softening unit 30 and other factors. In one embodiment, the concentrated brine directed to the softening unit 30 constitutes approximately 1% to approximately 5%, by volume, of the produced water directed into the softening unit 30. Control of the pH in the softening unit 30 can be achieved in various ways as appreciated by those skilled in the art. For example, in the case of a caustic, the caustic addition and concentrated brine flow can be controlled or ratioed to the feed flow into the softening unit 30 with fine adjustments made to the caustic addition and/or the amount of concentrated brine feed to the softening unit 30.

In one embodiment, there may not be a need for adding a softening reagent or reagents to the produced water. In this embodiment, the concentrated brine recycled to a selected point in the process upstream of the evaporator may be sufficient to raise the pH of the produced water to a desirable level. As noted before, the concentrated brine from the evaporator 34 can be injected into the produced water at various points upstream of the evaporator. For example, the concentrated brine can be injected into the produced water at or upstream of the preheater 26.

There are many advantages to the process described above. First, recycling the concentrated brine assists in raising the pH of the produced water in the softening unit 30. This means that less softening reagent is required and this is particularly significant in caustic softening. Further, the recycling of the concentrated brine to the softening unit 30 may expedite the softening process, reducing the size and consequently the cost of the softening tank or tanks.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering oil from an oil-bearing formation, comprising:
   a. recovering an oil-water mixture from the oil-bearing formation;
   b. separating the oil-water mixture into produced oil and produced water having hardness therein;
   c. directing the produced water to an evaporator and evaporating at least a portion of the produced water to produce a concentrated brine and steam;
   d. condensing the steam to form a distillate;
   e. directing the distillate to a steam generator and heating the distillate in the steam generator to produce steam;
   f. injecting the steam produced by the steam generator into an injection well;
   g. softening the produced water upstream of the evaporator by raising the pH of the produced water by:
      i. mixing a caustic with the produced water;
      ii. directing at least a portion of the concentrated brine from the evaporator and mixing the concentrated brine with the produced water to enhance softening; and
      iii. wherein the caustic and the concentrated brine combine to raise the pH of the produced water and soften the produced water.

2. The method of claim 1 including directing the produced water to a softening unit upstream of the evaporator and injecting the caustic into the softening unit and mixing the caustic with the produced water in the softening unit; and directing the concentrated brine into the softening unit and mixing the concentrated brine with the produced water and the caustic.

3. The method of claim 2 wherein the flow of the concentrated brine into the softening unit is approximately 1% to approximately 5% of the flow of produced water into the softening unit.

4. A method of recovering oil from an oil well, comprising:
   a. recovering an oil-water mixture from the well;
   b. separating the oil-water mixture into produced oil and produced water having hardness therein;
   c. softening the produced water by adding a softening reagent to the produced water and raising the pH of the produced water;
   d. after softening the produced water, directing the produced water to an evaporator and evaporating at least a portion of the produced water to form steam and a concentrated brine;
   e. directing at least a portion of the concentrated brine from the evaporator and mixing the concentrated brine with the produced water upstream of the evaporator to further raise the pH of the produced water and facilitate softening of the produced water;
   f. condensing the steam to form a distillate;
   g. directing the distillate to a steam generator and heating the distillate in the steam generator to produce steam; and
   h. injecting the steam produced by the steam generator into an injection well.

5. The method of claim 4 including directing the produced water to a softening unit upstream of the evaporator and mixing the softening reagent with the produced water in the softening unit; and directing the concentrated brine from the evaporator to the softening unit and mixing the concentrated brine with the produced water and the softening reagent in the softening unit.

6. The method of claim 5 wherein the softening unit includes a reactor and the method includes mixing a caustic and the concentrated brine with the produced water in the reactor to raise the pH of the produced water.

7. The method of claim 4 wherein the produced water is directed into a softening unit where the softening reagent is mixed with the produced water; and wherein the flow of concentrated brine into the softening unit is 1-5% by volume of the flow of produced water into the softening unit.

8. The method of claim 4 further including seeding the produced water or the concentrated brine with calcium carbonate to reduce the tendency of hardness compounds to scale process equipment.

9. A method of recovering oil from an oil-bearing formation, comprising:
   a. recovering an oil-water mixture from the oil-bearing formation;
   b. separating the oil-water mixture into produced oil and produced water having hardness therein;
   c. directing the produced water to an evaporator and evaporating at least a portion of the produced water to produce a concentrated brine and steam;
   d. condensing the steam to form a distillate;
   e. directing the distillate to a steam generator and heating the distillate in the steam generator to produce steam;
   f. injecting the steam produced by the steam generator into an injection well; and
   g. softening the produced water upstream of the evaporator by raising the pH of the produced water by directing at least a portion of the concentrated brine from the evaporator and mixing the concentrated brine with the produced water to enhance softening.

10. The method of claim 9 including directing the produced water to a softening unit upstream of the evaporator and injecting a caustic into the softening unit and mixing the caustic with the produced water in the softening unit; and mixing the concentrated brine with the produced water and the caustic.

11. The method of claim 10 wherein the flow of the concentrated brine into the softening unit is approximately 1% to approximately 5% of the flow of produced water into the softening unit.

* * * * *